(12) United States Patent
Achez

(10) Patent No.: US 9,010,354 B2
(45) Date of Patent: Apr. 21, 2015

(54) EASY-FLOW VALVE

(76) Inventor: Bert J. Achez, Topanga, CA (US)

( * ) Notice: Subject to any disclaimer, the term of this patent is extended or adjusted under 35 U.S.C. 154(b) by 656 days.

(21) Appl. No.: 13/270,302

(22) Filed: Oct. 11, 2011

(65) Prior Publication Data

US 2012/0090711 A1   Apr. 19, 2012

Related U.S. Application Data

(60) Provisional application No. 61/455,230, filed on Oct. 15, 2010.

(51) Int. Cl.
| | | |
|---|---|---|
| *F16K 51/00* | (2006.01) | |
| *F16L 37/40* | (2006.01) | |
| *F01P 3/20* | (2006.01) | |
| *B08B 3/04* | (2006.01) | |
| *F01P 11/04* | (2006.01) | |
| *F16L 37/23* | (2006.01) | |

(52) U.S. Cl.
CPC .............. *F01P 3/205* (2013.01); *F16L 37/40* (2013.01); *B08B 3/04* (2013.01); *F01P 11/04* (2013.01); *F16L 37/23* (2013.01)

(58) Field of Classification Search
CPC ............ B08B 3/04; F01P 11/06; F01P 3/205; F01P 11/04; F16L 37/40
USPC .............. 137/238, 240; 440/88 N; 251/149.1
See application file for complete search history.

(56) References Cited

U.S. PATENT DOCUMENTS

| | | | | | |
|---|---|---|---|---|---|
| 1,427,105 | A | * | 8/1922 | Hanlan, Jr. .................. | 251/149.1 |
| 1,550,850 | A | * | 8/1925 | Towle .......................... | 251/149.1 |
| 3,464,436 | A | * | 9/1969 | Bruning ....................... | 137/237 |
| 3,550,612 | A | * | 12/1970 | Maxon .......................... | 137/112 |
| 6,006,784 | A | * | 12/1999 | Tsutsui et al. ................ | 137/801 |
| 6,027,097 | A | | 2/2000 | Humphreys | |
| 7,150,665 | B1 | * | 12/2006 | Soreide et al. .............. | 440/88 N |
| 7,625,256 | B2 | * | 12/2009 | Bertino et al. .............. | 440/88 N |
| 2009/0029609 | A1 | | 1/2009 | Breece et al. | |

* cited by examiner

*Primary Examiner* — Kevin Lee
(74) *Attorney, Agent, or Firm* — Reginald F Roberts

(57) ABSTRACT

A quick and efficient method to flush out engines, and appropriate machinery and tools for carrying out this operation. The machinery/tools are (a) a flange; and (b) a self-sealing quick connect-disconnect male-female coupling that connects to and through the center of the flange, terminates at a specified distance on the interior of a surface ending with threads or barbs or a quick disconnect, and is attached to a y-shaped connector, to provide a liquid to a cooling system for the engine.

19 Claims, 5 Drawing Sheets

EASY-FLOW VALVE

REFERENCE TO RELATED APPLICATION

This non-provisional application is based on provisional application No. 61/455,230, filed Oct. 15, 2010.

BACKGROUND OF THE INVENTION

The present invention relates to liquid distribution. More particularly, the invention relates to providing an inlet for a liquid from an exterior location for conveyance to an interior location.

Cooling is a critical phase of engine operation. Cooling water passes through the cylinder heads and block, drawing off heat generated by fuel combustion and engine friction. Proper operation of the cooling system is critical to maintaining satisfactory engine operation and performance. Engines at sea, however, use salt water to do this, which is very corrosive to the out-drive and engine parts. Therefore it is imperative to flush a cooling system after each use. Hence, the need for a fast efficient way to flush out the boat or ship without the need to lift the engine cover, deal with shut-off valves, and/or have need for current flush-out equipment placed on the out-drive—which must be watched mindfully during operation.

SUMMARY OF THE INVENTION

In general, the present invention in a first aspect provides an easy-flow valve comprising (a) a tubular body having first and second ends; (b) a quick connect-disconnect first coupling at the first end of the tubular body; (c) a plurality of barbs or threads on surface of the second end of the tubular body, forming a quick connect-disconnect second coupling at the second end of the tubular body; (d) a flange near the first end of the tubular body, for mounting the valve against a flat surface, the flange being connected to the first coupling and to the tubular body near the first end of the tubular body, the flange circumscribing the first coupling and the tubular body; and (e) a lock nut near and circumscribing the second end of the tubular body, for locking and unlocking the easy-flow valve.

In a second aspect the invention provides an easy-flow flushing system for flushing out an engine and out-drive. The system comprises (a) an easy-flow valve comprising a tubular body having first and second ends; a quick connect-disconnect first coupling at the first end of the tubular body, for incoming water; a plurality of barbs or threads on surface of the second end of the tubular body, forming a quick connect-disconnect second coupling at the second end of the tubular body; a flange near the first end of the tubular body, for mounting the valve against a flat surface, the flange being connected to the male coupler of the first coupling and to the tubular body near the first end of the tubular body, the flange circumscribing male coupler of the first coupling and the tubular body; and a lock nut near and circumscribing the second end of the tubular body, for locking and unlocking the easy-flow valve; (b) a first conduit for conveying a portion of water out of the system, flushing out the out-drive, from the easy-flow valve through a y-shaped connector to a second conduit; (c) a first segment of the second conduit, for conveying a portion of the water out of the system; (d) a second segment of the second conduit, for conveying a portion of the water to and through an impeller; and (e) a third conduit, for conveying water to a circulation pump of the engine, for circulation through the engine.

In a third aspect, the invention provides a sealing cap for an easy-flow valve. The sealing cap comprises (a) an open first end; (b) a closed second end; (c) an outer surface and an inner surface; (d) a washer disposed at the second end of the sealing cap within the inner surface of the sealing cap; (e) an O-ring disposed within the inner surface near the second end of the sealing cap; (f) a first groove in which the O-ring is seated; (g) a plurality of ball bearings seated in concave openings near the first end of the sealing cap; (h) an outer sleeve surrounding the ball bearings, which float freely in the sleeve; (i) a cylindrical member having an outer surface on which the sleeve slides; (j) a spring surrounding the cylindrical member, for urging the sleeve to a closed or locked configuration; (k) a snap ring disposed in front of and retaining the sleeve; and (l) a second groove, in which the snap ring is seated.

DETAILED DESCRIPTION OF THE DISCLOSED EMBODIMENTS

Figure 1:
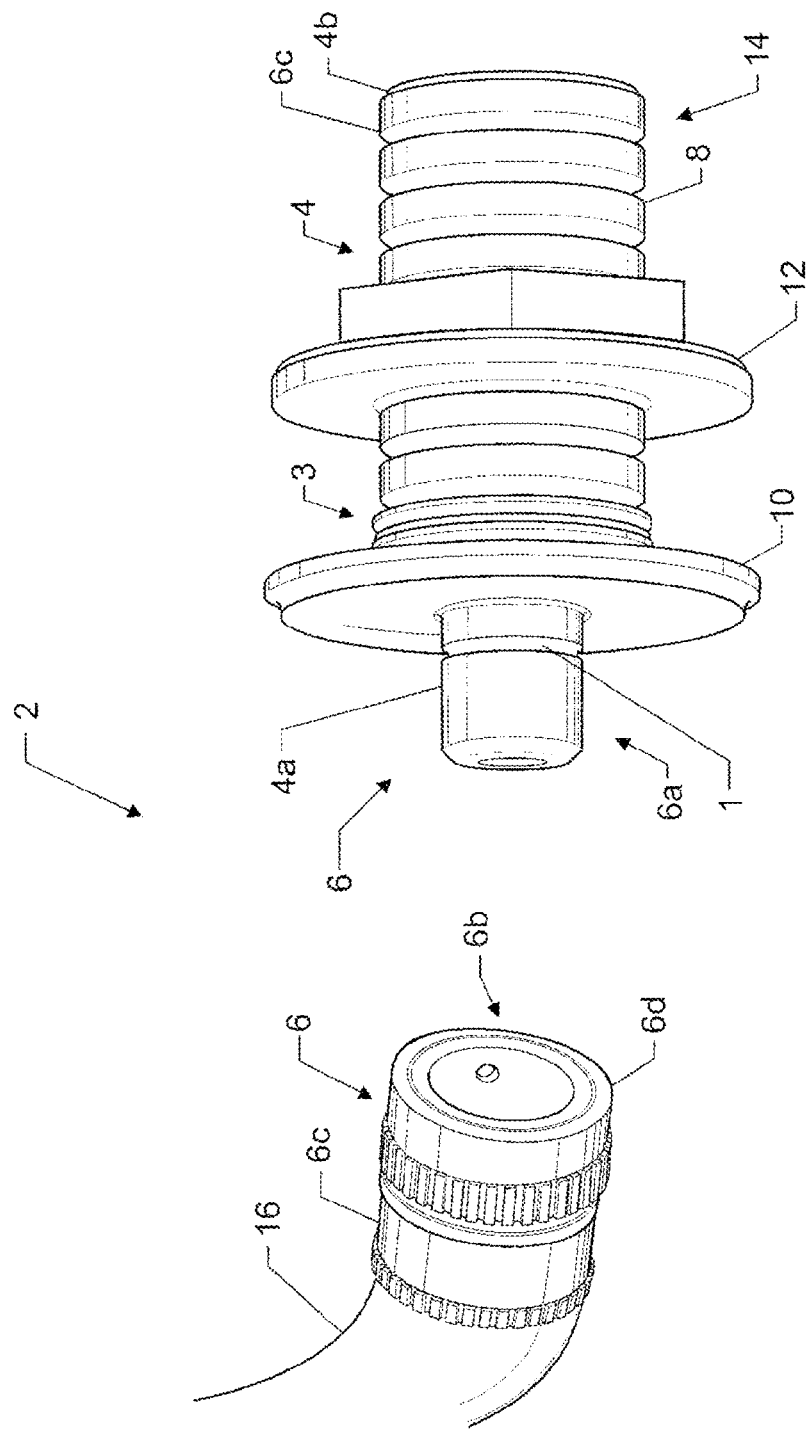
FIG. 1 is a schematic representation of an easy-flow valve, made in accordance with the principles of the present invention, with a hose attached thereto.

More specifically, reference is made to FIG. 1, in which is shown an easy-flow valve, made in accordance with the principles of the present invention, and generally designated by the numeral 2.

The easy-flow valve 2 comprises a tubular body 4 having first and second ends 4a and 4b; a quick connect-disconnect first coupling 6 at the first end 4a of the tubular body 4; a plurality of barbs or threads 8 on the outer surface 4c of the second end 4b of the tubular body 4; a flange 10 near the first end 4a of the tubular body 4; and a lock nut 12 circumscribing the tubular body 4.

The barbs or threads 8 on the outer surface 4c of the tubular body 4 form a quick connect-disconnect second coupling 14 at the second end 4b of the tubular body 4. The flange 10 is for mounting the valve 2 against a flat surface (not shown). Although the flange 10 enables mounting on a flat surface, weld-on or thread-on mounts would not require a flange. The flange 10 is connected to a male coupler 6a of the first coupling 6 and to the tubular body 4 near the first end 4a of the tubular body 4, and circumscribes the back end 6c of a male coupler 6a of the first coupling 6 and the tubular body 4. The lock nut 12 utilizes a plurality of threads 3 to lock and unlock the easy-flow valve 2.

The first coupling 6 has a male coupler 6a and a female coupler 6b, and is thereby self-sealing. The male coupler 6a includes a circumscribing groove 1 for locking into place the female coupler 6b. The self-sealing capability of the first coupling 6 prevents air from entering a work piece such as a boat engine (not shown) when the valve 2 is being used to service the work piece. During such operation, the first coupling 6 may beneficially be connected to a garden hose 16 for conveying water (not shown) to the easy-flow valve 2. The hose 16 is attached to the threaded end 6c of the female coupler 6b, and the unthreaded end 6d of the female coupler 6b is connected to the male coupler 6a of the easy-flow valve 2.

Figure 2:
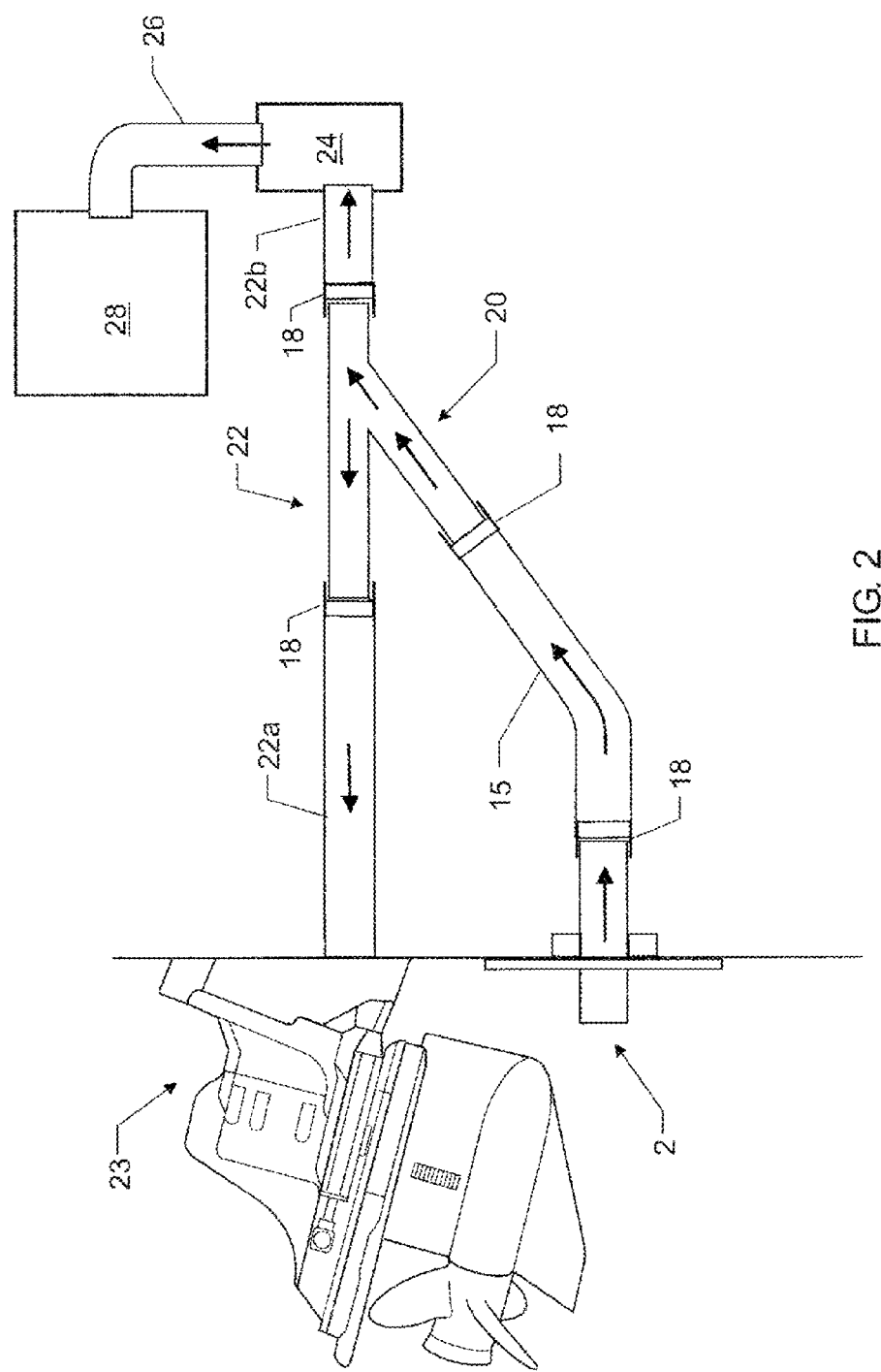
FIG. 2 is a schematic representation of a system for flushing out an engine on a boat, in accordance with the principles of the present invention.

Reference is now made to FIG. 2, in which is shown a system, made in accordance with the principles of the present invention, for flushing out an engine for a boat or ship (not shown).

The system comprises the easy-flow valve 2 shown in detail in FIG. 1, a heavy-duty service hose 15, a plurality of fasteners 18 attached to the hose 15, a y-shaped connector 20, a first connecting member 22, an impeller 24, and a second connecting member 26. The hose 15 conveys incoming water from the easy-flow valve 2 through the y-shaped connector 20 to the first connecting member 22. With the engine off, water flows from and through the first connecting member 22, and out through the out-drive 23 of the system. With the engine running, a portion of the water flows out of the system through a first segment 22a of the first connecting member 22, and a portion flows through a second segment 22b of the first connecting member 22 to and through the impeller 24 and through a second connecting member 26 to a circulation pump 28. Water from the circulation pump 28 is then circulated through the engine on board the boat or ship (not shown). It is important to circulate water through the system with the engine off and on, in order to flush the entire system.

Figure 3:
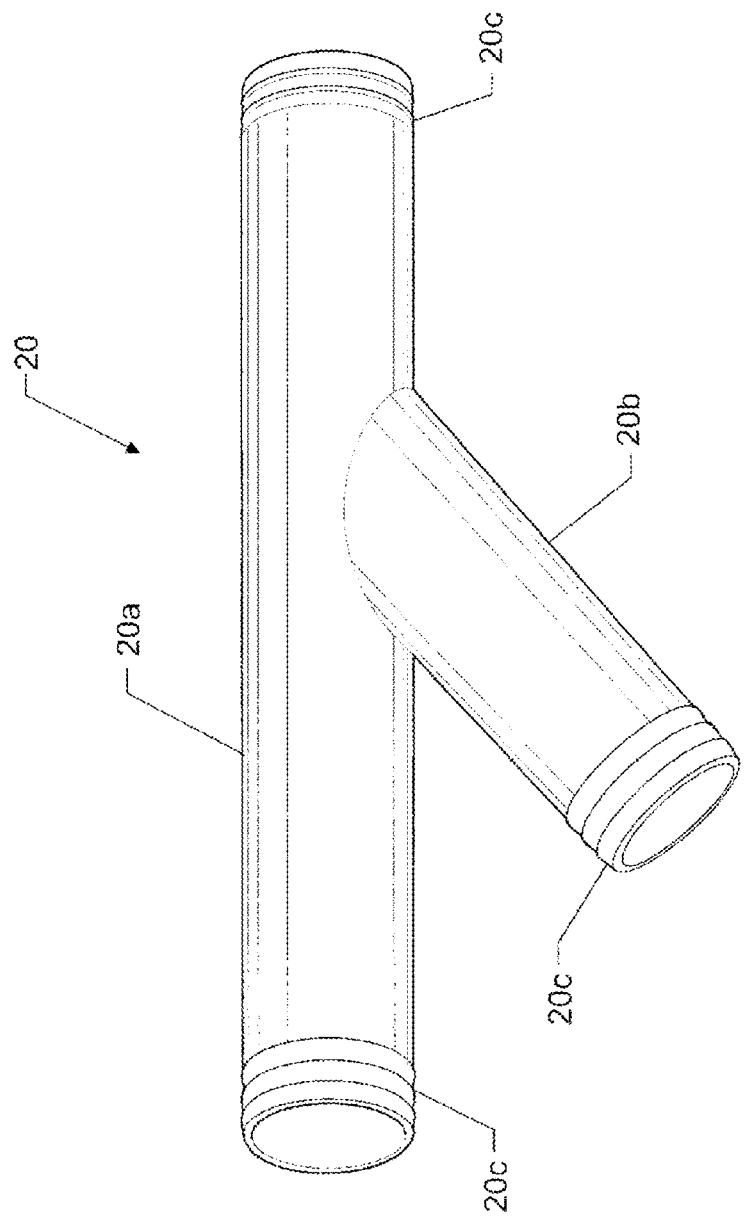
FIG. 3 is a schematic representation of a y-shaped connector equipped with barbs.

The detailed construction of the y-shaped connector 20 is shown in FIG. 3. The y-shaped connector 20 comprises a first segment 20a and a second segment 20b. The first and second segments 20a, 20b define a geometric "y." Each segment 20a and 20b is provided with a plurality of barbs 20c to facilitate connection to the fasteners 18 on the second connecting member 22 shown in FIG. 2.

Figure 4:
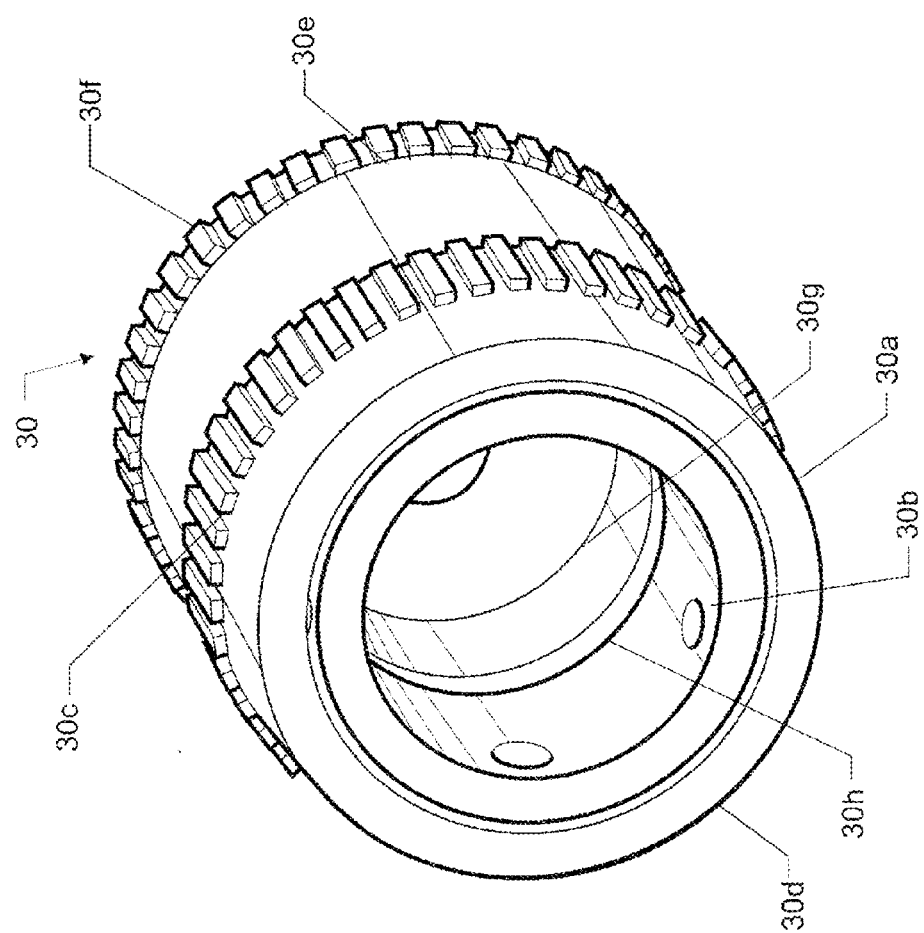
FIG. 4 is a schematic representation of a sealing cap for the easy-flow valve shown in FIG. 1
Figure 5:
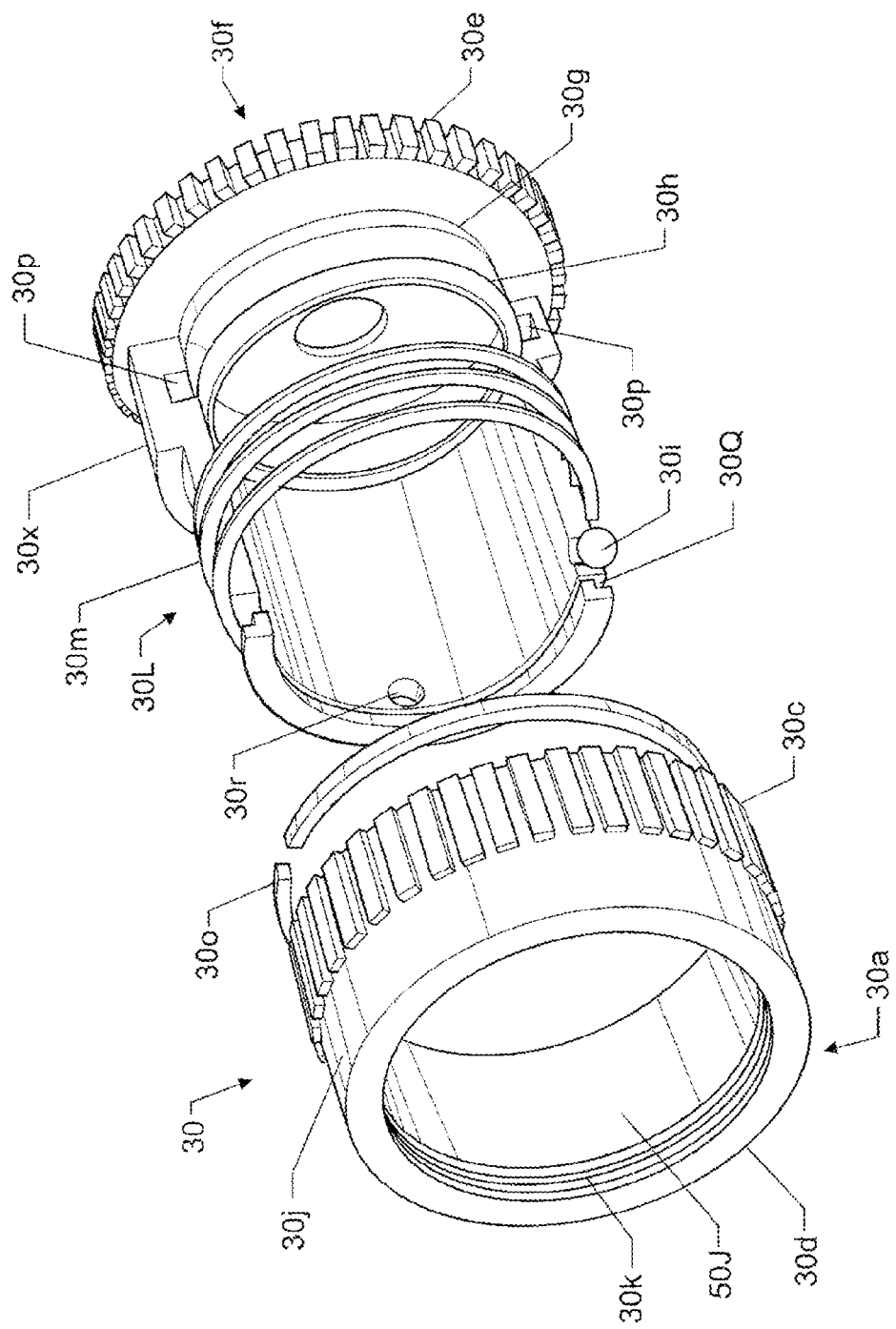
FIG. 5 is an exploded view of the sealing cap shown in FIG. 4.

In FIGS. 4 and 5 is shown a sealing cap, generally designated by the numeral 30, for the easy-flow valve 2 shown in FIG. 1.

The sealing cap 30 pertains to quick connect/disconnect couplings for a standard garden hose. More specifically, the sealing cap 30 caps off the male coupler 6a of the easy-flow valve 2. The cap 30 should remain on the male coupler 6a at all times except during the flushing process. While the system is being flushed, the female coupler 6b is connected to the garden hose 16, FIG. 1, and mated with the male coupler 6a. During this time the male coupler 6a does not need to be capped, because the male coupler 6a is being used as a sealed passageway for water. After being flushed, the engine is turned off, and the cap 30 is replaced on the male coupler 6a using the same procedure as in connecting the female coupler 6b. Usually, the female coupler 6b is connected to a garden hose for spraying down a boat. However, in the case of the present invention, the male coupler 6a of the easy flow valve 2 is used as an inlet to a closed environment, and it is critical that said environment be completely sealed. The cap 30 is an external means of sealing the easy-flow valve 2 shown in FIG. 1 and the system shown in FIG. 2 for flushing out an engine on a boat or ship. If the male coupler 6a is provided with an internal spring disk valve, such a valve restrains water and air from entering by spring pressure, forcing an element back to its seat, and thereby forming an air/water-tight seal. This seal will not open from the suction created by the circulation pump 28, but can be overcome by standard water pressure used to flush out the engine. The cap 30, however, not only seals securely the male coupler 6a of the easy-flow valve 2, but also provides protection from wear and abrasion. Moreover, the cap 30 provides a uniquely efficient and quick way to seal and protect the male coupler 6a of the easy-flow valve 2 without the possibility of the connection becoming loosened. Preferably, a connecting chain (not shown) is attached from the sealing cap 30 to the flange 10, in order to prevent accidental loss of the cap 30.

More specifically, the sealing cap 30 comprises an outer surface 30a and an inner surface 30b. The outer surface 30a is provided with a plurality of protuberances 30c at a first end 30d, and a plurality of smaller protuberances 30e at a second end 30f. The protuberances 30c and 30e provide a grooved, rough surface for non-slip gripping of the sealing cap 30. The first end 30d of the cap 30 is open, and the second end 30f is closed. A washer 30g is disposed at the second end 30f within the inner surface 30b of the cap 30. An O-ring 30h is disposed within the inner surface 30b near the second end 30f of the sealing cap 30, and is seated in a groove 30p. The washer 30g forms a sealed passageway when the male coupler 6a seats against the washer 30g. The male coupler 6a fits tightly in and through the O-ring 30h to form a second seal.

Near the first end 30d of the cap 30 are three evenly-spaced ball bearings 30i. The ball bearings 30i are seated in concave openings 30r that are smaller than the ball bearings 30i, so that the ball bearings 30i do not and cannot fall through the openings 30r. The ball bearings 30i float freely against an outer surrounding sleeve 30j. The inside surface 30k of the sleeve 30j is tapered at its front end 50j, and slides on the outer surface 50m of a cylindrical member 30l. A spring 30m surrounding the cylindrical member 30l rests against a thicker portion 30x of the outside surface 50m of the cylindrical member 30l, and urges the tapered sleeve 30j to a closed or locked configuration. In this position the inside surface 30k of the tapered sleeve 30j is thickest, causing a downward pressure against the ball bearings 30i, pushing them into a groove surrounding the male coupler 6a. There is now a seal at the washer 30g and the O-ring 30h, and the ball bearings 30i are pressed hard, seating them firmly in the openings 30r. The spring 30m keeps the sleeve 30j in a locked configuration. If the sleeve 30j is pulled backward, the ball bearings 30i are disengaged, releasing the male coupler 6a. A snap ring 30o fits in front of and retains the sleeve 30j, and is seated in a groove 30q.

The cap 30 ensures operation of the water-suctioning process created by the circulation pump 28 (FIG. 2) without sucking in air, which would cause the engine to overheat. The cap 30 provides a fail-safe mechanism that prevents air, water, and other potential contaminants from being sucked into a boat's cooling system via the male coupler 6a. For a marine application involving boats, brass or stainless-steel coupling should be used. When the cap 30 and the male coupler 6a are mated, the first end of the male coupler 6a presses against the washer 30g at the second end 30f of the cap 30, and seats into the O-ring 30h. This operation completely seals off the male coupler 6a from air and water.

The present invention enables change from flushing out the engine, attaching a nozzle (not shown), and spraying the boat down without turning off the water supply.

While certain specific embodiments and details have been described to illustrate the principles of the present invention, it will be apparent to those skilled in the art that many modifications are possible within the scope of the claimed invention.

What is claimed is:
1. An easy-flow valve comprising:
a tubular body having a first end and a second end;
a first male quick connect-disconnect coupling at the first end of the tubular body;
a second male quick connect-disconnect coupling at the second end of the tubular body;

a flange connected to an inner end of the first male quick connect-disconnect coupling and connected to the tubular body adjacent the first end, wherein the flange circumscribes the first male quick connect-disconnect coupling and the tubular body; and a lock nut connected to the second male quick connect-disconnect coupling and the tubular body,
wherein the lock nut circumscribes the second end of the tubular body, and
wherein the lock nut is to lock and to unlock the easy-flow valve against a surface.

2. The easy-flow valve of claim 1, wherein the first male quick connect-disconnect coupling is to connect to a female coupler of an object to seal the first end of the tubular body to the object.

3. The easy-flow valve of claim 1, wherein the second male quick connect-disconnect coupling further comprises a plurality of barbs or threads on an outer surface of the second end of the tubular body.

4. The easy-flow valve of claim 1, wherein the flange is to abut a flat surface of an object.

5. The easy-flow valve of claim 1, wherein the first male quick connect-disconnect coupling further comprising a groove along an outer surface of the male quick connect-disconnect coupling, wherein the groove is to lock with a female coupler of another object.

6. The easy-flow valve of claim 1, wherein the first male quick connect-disconnect coupling is to couple with a female coupler of an object to form an air-tight seal.

7. The easy-flow valve of claim 6, wherein the object is a hose.

8. An easy-flow flushing system for flushing out an engine and out-drive, the system comprising:
an easy-flow valve comprising:
a tubular body having a first end and a second end;
a first male quick connect-disconnect coupling at the first end of the tubular body, wherein the easy-flow valve receives water at first end of the tubular body;
a second male quick connect-disconnect coupling at the second end of the tubular body, wherein the easy-flow valve expels the water at the second end of the tubular body to a hose;
a flange connected to an inner end of the first male quick connect-disconnect coupling and connected to the tubular body adjacent the first end, wherein the flange circumscribes the first male quick connect-disconnect coupling and the tubular body; and
a lock nut connected to the second male quick connect-disconnect coupling and the tubular body,
wherein the lock nut circumscribes the second end of the tubular body, and
wherein the lock nut is to lock and to unlock the easy-flow valve against a surface;
the hose comprising:
a first connector connected to the second male quick connect-disconnect coupling of the easy-flow valve, wherein the hose is to receive the water from the easy-flow valve at a first connector end of the hose;
a second connector connected to a first conduit, wherein the hose is to pass the water to the first conduit at a second connector end of the hose;
the first conduit to convey a portion of the water out of the system, flushing out the out-drive, from the easy-flow valve through a y-shaped connector to a second conduit;
a first segment of the y-shaped connector to convey a portion of the water out of the system;
a second segment of the y-shaped connector to convey a portion of the water to an impeller; and
a third conduit to convey water from the impeller to a circulation pump of the engine.

9. The easy-flow flushing system of claim 8, wherein the first male quick connect-disconnect coupling of the easy-flow valve is to connect to a female coupler of an object and to connect and to seal the first end of the tubular body to the object.

10. An easy-flow flushing system for flushing out an engine and an out-drive, the system comprising:
an easy-flow valve comprising:
a tubular body having a first end and a second end;
a first male quick connect-disconnect coupling at the first end of the tubular body, wherein the easy-flow valve is to receive fluid at first end of the tubular body;
a second male quick connect-disconnect coupling at the second end of the tubular body, wherein the easy-flow valve is to expel the fluid at the second end of the tubular body to a hose;
a flange connected to an inner end of the first male quick connect-disconnect coupling and connected to the tubular body adjacent the first end, wherein the flange circumscribes the first male quick connect-disconnect coupling and the tubular body;
a lock nut connected to the second male quick connect-disconnect coupling and the tubular body,
wherein the lock nut circumscribes the second end of the tubular body, and
wherein the lock nut is to lock and to unlock the easy-flow valve against a surface;
the hose comprising:
a first connector connected to the second male quick connect-disconnect coupling of the easy-flow valve, wherein the hose is to receive the fluid from the easy-flow valve at a first connector end of the hose;
a second connector connected to a conduit, wherein the hose is to pass the fluid to the conduit at a second connector end of the hose; and
the conduit to:
receive the fluid from the hose;
convey a portion of the fluid out of the system, wherein the portion of the fluid flushes out the out-drive; and
convey another portion of the fluid to an impeller.

11. The easy-flow flushing system of claim 10, wherein the first male quick connect-disconnect coupling of the easy-flow valve is to connect to a female coupler of an object and to connect and to seal the first end of the tubular body to the object.

12. The easy-flow flushing system of claim 10, further comprising a second conduit connected to the impeller for conveying at least a portion of the fluid from the impeller to a circulation pump of the engine.

13. The easy-flow flushing system of claim 10, wherein the second male quick connect-disconnect coupling further comprises of a plurality of barbs or threads on an outer surface of the second end of the tubular body.

14. The easy-flow flushing system of claim 10, wherein the easy-flow flushing system is integrated into a boat or ship.

15. The easy-flow flushing system of claim 10, wherein the hose is a service hose.

16. The easy-flow flushing system of claim 10, wherein the conduit is a y-shaped connector.

17. The easy-flow flushing system of claim 10, wherein the flange is to abut a flat surface of an object.

18. The easy-flow flushing system of claim 10, wherein the first male quick connect-disconnect coupling further comprises a groove along an outer surface of the male quick connect-disconnect coupling, wherein the groove is to lock with a female coupler of another object.

19. The easy-flow flushing system of claim 10, wherein the first male quick connect-disconnect coupling is to couple with a female coupler of an object to form an air-tight seal.

* * * * *